(12) United States Patent
Rottenstreich et al.

(10) Patent No.: US 10,009,278 B2
(45) Date of Patent: Jun. 26, 2018

(54) TIME-EFFICIENT NETWORK FUNCTION VIRTUALIZATION ARCHITECTURE

(71) Applicant: Mellanox Technologies Ltd., Yokneam (IL)

(72) Inventors: Ori Rottenstreich, Kiriat Motzkin (IL); Dror Goldenberg, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 556 days.

(21) Appl. No.: 14/616,760

(22) Filed: Feb. 9, 2015

(65) Prior Publication Data

US 2016/0234077 A1 Aug. 11, 2016

(51) Int. Cl.
*G06F 15/173* (2006.01)
*H04L 12/801* (2013.01)
*H04L 12/24* (2006.01)

(52) U.S. Cl.
CPC .............. *H04L 47/12* (2013.01); *H04L 41/16* (2013.01); *H04L 41/5054* (2013.01); *H04L 41/12* (2013.01)

(58) Field of Classification Search
CPC ..... H04L 47/12; H04L 41/5054; H04L 41/16; H04L 41/12
See application file for complete search history.

(56) References Cited

U.S. PATENT DOCUMENTS

| | | | | |
|---|---|---|---|---|
| 2012/0317142 A1* | 12/2012 | Broecheler | ....... | G06F 17/30958 707/770 |
| 2013/0042003 A1* | 2/2013 | Franco | ................ | H04L 67/1097 709/226 |
| 2015/0066485 A1* | 3/2015 | Barrett | ................ | G06F 17/2735 704/10 |
| 2015/0180730 A1* | 6/2015 | Felstaine | ............... | H04L 41/022 709/225 |
| 2015/0269211 A1* | 9/2015 | da Silva | ............ | G06F 17/30353 707/725 |
| 2016/0028604 A1* | 1/2016 | Chakrabarti | ........ | H04L 43/0852 370/252 |
| 2016/0092259 A1* | 3/2016 | Mehta | ................. | G06F 9/45558 718/1 |

(Continued)

OTHER PUBLICATIONS

ETSI Group Specification Use Case # 4 (ETSI GS NFV 001 V1.1.1 (Oct. 2013), Network Functions Virtualization (NFV) Use Cases, Use Case # 4 pp. 23-28, submitted on the record with Jul. 7, 2015 IDS submission, retrieved from the record; hereinafter UC4).*

(Continued)

*Primary Examiner* — Michael A Keller
(74) *Attorney, Agent, or Firm* — D. Kligler IP Services Ltd.

(57) ABSTRACT

A method for designing a Network Function Virtualization (NFV) architecture includes accepting a definition of multiple Virtual Network Functions (VNFs), and of one or more packet types having respective occurrence probabilities, wherein each packet type is associated with a respective subset of the VNFs that are to be applied to packets of that packet type. Information on multiple available physical computers, each capable of running only a partial subset of the multiple VNFs, is further accepted. The VNFs are allocated to the physical computers by applying an optimality criterion to definition and the information.

24 Claims, 4 Drawing Sheets

(56) References Cited

U.S. PATENT DOCUMENTS

2016/0134474 A1* 5/2016 Strassner ............ H04L 41/0816
                                                                 709/223

OTHER PUBLICATIONS

Chiosi et al., "Network Functions Virtualisation", Introductory White Paper, SDN and OpenFlow World Congress, Darmstadt, Germany, 16 pages, Oct. 22-24, 2012.

Chiosi et al., "Network Functions Virtualisation (NFV)", Introductory White Paper, SDN and OpenFlow World Congress, Frankfurt, Germany, 16 pages, Oct. 15-17, 2013.

ETSI GS NFV 001, "Network Functions Virtualisation (NFV); Use cases", Version 1.1.1., 50 pages, Oct. 2013.

Edmonds, J., "Paths, Trees, and Flowers", Canadian Journal of Mathematics, vol. 17, No. 3, pp. 449-467, year 1965.

Rottenstreich et al., "Minimizing Delay in Shared Pipelines", Proceedings of the 2013 IEEE 21st Annual Symposium on High-Performance Interconnects, pp. 9-16, Aug. 21-23, 2013.

\* cited by examiner

TIME-EFFICIENT NETWORK FUNCTION VIRTUALIZATION ARCHITECTURE

FIELD OF THE INVENTION

The present invention relates generally to communication networks, and particularly to methods and systems for assigning virtual network functions to hardware resources.

BACKGROUND OF THE INVENTION

In a Network Function Virtualization (NFV) architecture, multiple Virtual Network Functions (VNFs), each comprising a software implementation of a communication service, are deployed in a pool of hardware machines. Services that can be implemented as VNFs include, for example, Load Balancing (LB), Firewall (FW), Deep Packet Inspection (DPI) and Quality of Experience (QoE).

NFV architecture is described, for example, by the Industry Specifications Group (ISG) of the European Telecommunications Standards Institute (ETSI), in "Network Functions Virtualisation—Update White Paper," SDN and OpenFlow World Congress", Frankfurt-Germany, Oct. 15-17, 2013, which is incorporated herein by reference. Use cases for the NFV architecture are described, for example, in "Network Functions Virtualisation (NFV); Use Cases," ETSI Group Specification (GS) NFV 001, version 1.1.1, October, 2013, which is incorporated herein by reference.

SUMMARY OF THE INVENTION

An embodiment that is described herein provides a method for designing a Network Function Virtualization (NFV) architecture, including accepting a definition of multiple Virtual Network Functions (VNFs), and of one or more packet types having respective occurrence probabilities. Each packet type is associated with a respective subset of the VNFs that are to be applied to packets of that packet type. Information on multiple available physical computers, each capable of running only a partial subset of the multiple VNFs, is further accepted. The VNFs are allocated to the physical computers by applying an optimality criterion to the definition and the information.

In some embodiments, allocating the VNFs includes generating a graph in which each vertex represents a respective VNF and each edge indicates that the VNFs represented by the vertices of that edge are allocated jointly to the same physical computer, and processing the graph in accordance with the optimality criterion.

In other embodiments, processing the graph includes partitioning the graph into subsets, each subset includes the vertices corresponding to respective VNFs that are allocated jointly to the same respective physical computer. In yet other embodiments, partitioning the graph includes selecting the subsets based on weights assigned to one or more edges of the graph.

In an embodiment, the method includes assigning the weights based on the definition. In another embodiment, selecting the subsets includes maximizing a sum of weights of the edges included in the subsets. In yet another embodiment, selecting the subsets includes maximizing the sum of weights in each subset individually.

In some embodiments, partitioning the graph includes defining at least two subsets that have a different number of vertices. In other embodiments, partitioning the graph includes partitioning the graph into a partition that includes pairwise non-adjacent edges, so that no two edges in the partition share a common vertex of the graph. In yet other embodiments, partitioning the graph includes selecting each of the subsets iteratively, by excluding the vertices of an already selected subset from the graph before selecting another subset. In yet further other embodiments, the method includes re-allocating the VNFs to the physical computers in response to a change in the definition or the information.

In an embodiment, the optimality criterion aims to minimize a latency of applying the VNFs to the packets by the physical computers. In another embodiment, the optimality criterion aims to set an upper bound on a latency of applying the VNFs to the packets by the physical computers. In yet another embodiment the optimality criterion aims to minimize a network bandwidth consumed by applying the VNFs when allocated to the physical computers.

There is additionally provided, in accordance with an embodiment that is described herein, apparatus for designing a Network Function Virtualization (NFV) architecture, the apparatus including a memory and a processor. The memory is configured to hold a definition of multiple Virtual Network Functions (VNFs), and of one or more packet types having respective occurrence probabilities, each packet type associated with a respective subset of the VNFs that are to be applied to packets of that packet type, and to further hold information on multiple available physical computers, each capable of running only a partial subset of the multiple VNFs. The processor is configured to allocate the VNFs to the physical computers by applying an optimality criterion to the definition and the information.

The present invention will be more fully understood from the following detailed description of the embodiments thereof, taken together with the drawings in which:

DETAILED DESCRIPTION OF EMBODIMENTS

Overview

A communication system that is based on Network Function Virtualization (NFV) typically comprises a pool of physical computers that run multiple Virtual Network Functions (VNFs). The communication system provides various services by applying the VNFs to the network traffic. The network traffic typically comprises packets of multiple types wherein each packet type is associated with one or more VNFs that should be applied to packets of that type. A network that is based on NFV architecture is also referred to herein as a NFV network.

A packet type can define, for example, a flow to which the packet belongs. A flow comprises a packet sequence generated by a given source. A flow can be identified, for example by a 5-tuple that specifies a Transmission Control Protocol/Internet Protocol (TCP/IP) connection, including a source IP address/port number, destination IP address/port number and the protocol in use.

Embodiments that are described herein provide methods and systems for allocating VNFs to physical computers of the communication system. A service that requires the processing by a group of VNFs is also referred to herein as a processing chain. In the disclosed techniques we typically assume that the processing outcome is independent of the processing order among the VNFs of the processing chain. The disclosed techniques are also applicable, however, to the case in which different processing orders result in different outcomes.

Typically, each of the physical computers is capable of running a partial subset of the VNFs. In the disclosed embodiments, the communication system comprises a VNF allocator component that allocates the VNFs to the physical computers. VNF allocation is also referred to herein as VNF placement.

In some of the disclosed embodiments, although not necessarily, the physical computers are assumed identical, wherein the number of VNFs that each computer can run is bounded by the same bound number. In such embodiments, any subset of the VNFs that belong to a given processing chain and that comprises a number of VNFs smaller or equal to the bound number can be allocated to each of the computers.

Given a set of VNFs that the NFV network supports and a set of physical computers, the VNFs can be allocated to the computers in various ways, wherein different allocation strategies may result in different system performance. An optimal design strategy allocates the VNFs in accordance with some optimality criterion.

Processing a given packet by VNFs that are placed on the same server is typically faster because the processing chain consumes no network bandwidth. The disclosed techniques do not rely on explicit counting of the amount of traffic on the network links, but rather attempt to minimize the processing time by allocating VNFs of the same processing chain to the same physical computer, thus achieving shorter processing latency. Such VNF placement uses the network efficiently by avoiding unnecessary network usage.

For example, the VNF allocator may assign all the VNFs that should be applied to the packets of a given type (or flow) to a single physical computer, thereby minimizing processing latency. In some embodiments, the overall processing delay of a packet depends strongly on the number of computers that process the packet, and is nearly independent of the number of VNFs applied in each individual computer. Therefore, a strategy of collocating the VNFs applied to a given packet type in a minimal number of physical computers achieves a minimal average packet processing delay.

In some disclosed embodiments, allocating the VNFs is based on representing the VNFs as vertices of a graph. Thus, each vertex of the graph corresponds to a respective VNF, and vertices that are connected by an edge indicate VNFs that are allocated jointly to the same physical computer. In some embodiments, the VNF allocator assigns to the graph edges numerical weights. Alternatively, the assigned edge weights are given to the VNF allocator as inputs. The weights are calculated, for example, based on the occurrence probabilities of the packet types. Alternatively or additionally, the weights depend on the subsets of VNFs that should be applied to the packets of each type. In some embodiments, the graph, including the edge weights, are provided to the VNF allocator as input, and the VNF allocator uses this input for finding the optimal VNF allocation.

In an embodiment, the VNF allocator allocates the VNFs by partitioning the graph into subsets of vertices, wherein the vertices in each subset correspond to respective VNFs that should be allocated jointly to the same physical computer. In some embodiments, the VNF allocator partitions the graph based on the weights assigned to the edges of the graph, e.g., by maximizing the sum of weights of the edges included in all of the subsets, in each subset individually, or both.

In an embodiment, the VNF allocator partitions the graph in an iterative process. In each iteration the VNF allocator selects one subset, and excludes the vertices of the selected subset from the graph before selecting other subsets in subsequent iterations.

In some embodiments, the VNF allocator allocates pairs of VNFs to physical computers, that each can run two or more VNFs. In such embodiments, the VNF allocator partitions the graph into pairwise non-adjacent edges so that no two edges in the partition share a common vertex of the graph. Such a partition is also referred to herein as a matching. In an embodiment, the VNF allocator selects a matching whose edges have a maximal sum of weights.

In some embodiments, the VNF allocator recognizes that the conditions and/or requirements that were used for allocating the VNFs have changed. In response, the VNF allocator re-allocates the VNFs to match the updated conditions or requirements. Re-allocating a VNF can be performed, for example, by moving the VNF from the currently hosting machine to another machine, using virtual machine migration techniques as known in the art.

In the disclosed techniques, a graph representation is used for designing a NFV network with optimal allocation of VNFs to physical computers. Using the disclosed methods and systems, optimal system performance such as a minimal average packet processing time can be achieved.

System Description

Figure 1:
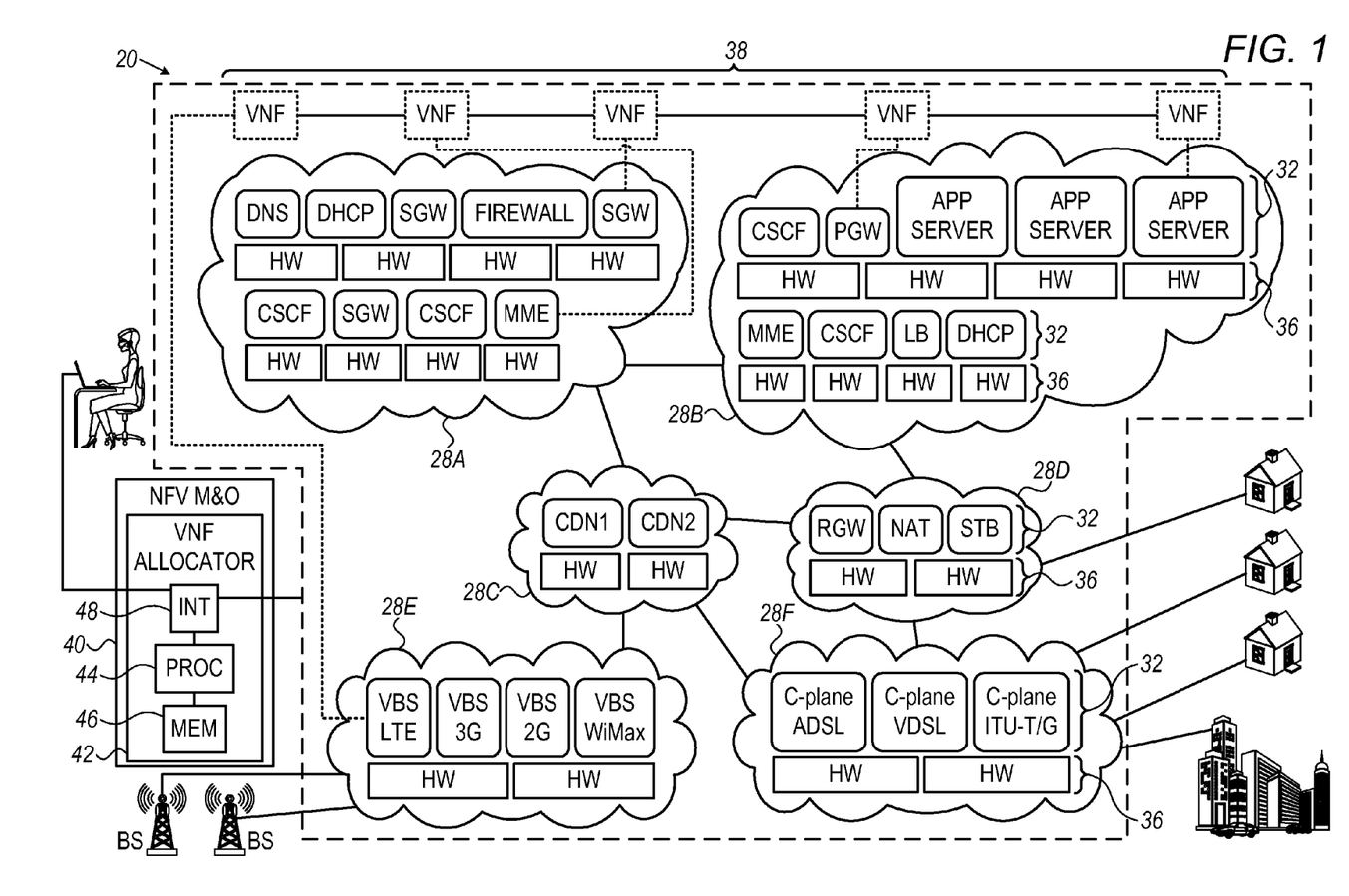
FIG. 1 is a block diagram that schematically illustrates a communication system that is based on Network Function Virtualization (NFV) architecture, in accordance with an embodiment that is described herein.

FIG. 1 is a block diagram that schematically illustrates a communication system that is based on Network Function Virtualization (NFV) architecture, in accordance with an embodiment that is described herein. In the description that follows, a communication network that is implemented using NFV architecture is referred to herein as a NFV network. System 20 comprises multiple interconnected networks 28. Each network 28 comprises a NFV network that supports a given set of communication services to be applied to the network traffic (packets). The communication services are implemented in software as Virtual Network Functions (VNFs) 32.

Each network 28 comprises a pool of multiple physical computers 36. Each computer 36 can communicate with other computers within the same and other networks. A physical computer is also referred to herein as a network element, or a hardware machine. Each physical computer is capable of running one or more VNFs. A single computer 36, however, is typically incapable of running all the VNFs that belong to a given processing chain concurrently, and therefore, VNFs 32 should be allocated to multiple available computers 36. Methods for optimal allocation of VNFs to hardware machines are described in detail below.

As noted above, the overall NFV architecture of system 20 comprises multiple NFV networks 28A ... 28F, each providing a given set of communication services using VNFs. Network 28A implements a mobile core network and IP Multimedia Subsystem (IMS), and provides services such as Domain Name System (DNS), Dynamic Host Configuration Protocol (DHCP), Serving Gateway (SGW), Call Session Control Function (CSCF) and Mobility management Entity (MME). Network 28B provides virtualization of several communication services such as Load Balancing (LB), Packet Gateway (PGW) and various other applications.

Network 28C virtualizes a Content Distribution Network (CDN). Network 28D virtualizes Home and Enterprise networks, to provide services such as a Residential Gateway (RGW), Network Address Translation (NAT), and a Setup Box (STB). Network 28E implements Virtual Base Stations (VBSs) as part of a radio access network, including a Long Term Evolution (LTE) VBS, a 3G VBS, a 2G VBS and a Worldwide Interoperability for Microwave Access (WiMax) VBS.

Network 28F provides virtualization of Fixed Access Networks that provide symmetric or asymmetric network access using any suitable technologies. In the example of network 28F, control plane VNFs include Asymmetric Digital Subscriber Line (ADSL), Very-high-bit-rate Digital Subscriber Line (VDSL), and relevant G series specifications defined by the Telecommunication Standardization Sector of the International Telecommunication Union (ITU-T), such as, for example, the ITU-T G.991.2 specification: Single pair High-speed DSL (SHDSL).

System 20 comprises a NFV Management and Orchestration (M&O) unit 40. NFV M&O unit 40 orchestrates and manages the usage of the physical and virtual resources in system 20. For example, NFV M&O unit 40 manages the virtualization functionality in each of networks 28 and in system 20 as a whole. Among other tasks, NFV M&O unit 40 manages the lifecycle of the various physical and virtual resources in system 20, such as distributed resource allocation, removal and upgrading among networks 28.

Traffic that flows through system 20 comprises packets of multiple types and may belong to different flows. Depending on the packet type, system 20 should apply to a given packet a corresponding set of services. In NFV architecture, an ordered set of VNFs that are applied to a packet is referred to herein as a forwarding graph. For example, in FIG. 1 a forwarding graph 38 includes the VNFs {VBS LTE, MME, SGW, PGW, App Server} to applied in this order.

NFV M&O unit 40 comprises a VNF allocator 42, which allocates VNFs 32 to physical computers 36. Since the VNFs can be allocated to computers 36 in several possible ways, VNF allocator 42 selects an allocation so as to achieve best performance in accordance with some optimality criterion. VNF allocator 42 comprises a processor 44 and a memory 46. Memory 46 may comprise one or more storage devices of any suitable technology, speed and storage capacity. VNF allocator 42 further comprises and an interface 48 for interfacing with networks 28, as well as with a human operator. Among other tasks, processor 44 may execute the VNF allocation task as will be described in detail below.

In some embodiments, the operator inputs design definitions, via interface 48, regarding the NFV architecture such as the supported VNFs, available physical resources, statistical properties of the network traffic and other suitable allocation policies. VNF allocator 42 may store the design definitions in memory 46. Based on the design definitions, processor 44 finds an optimal (or close to optimal) allocation of the VNFs to the physical resources.

Figure 2:
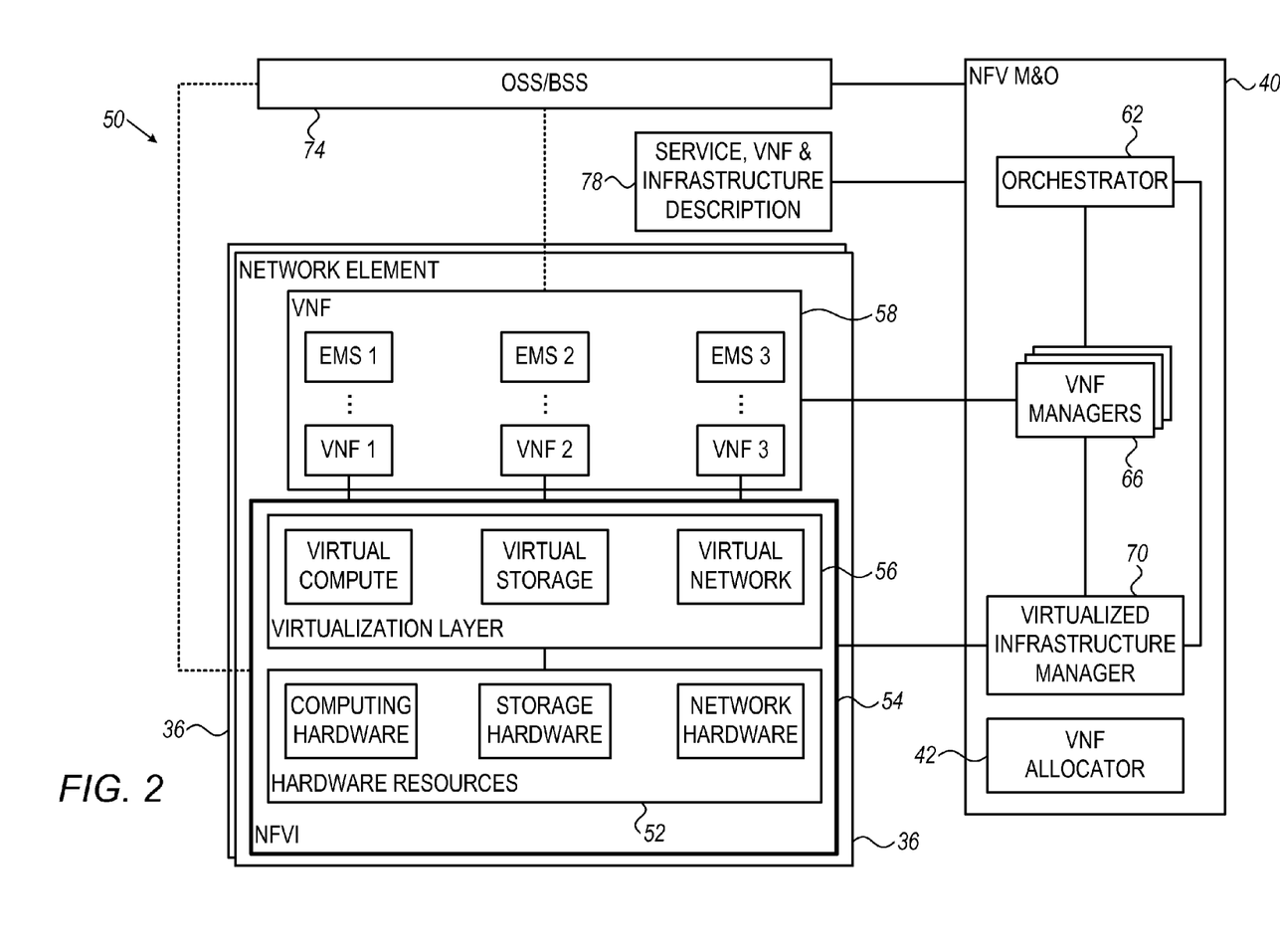
FIG. 2 is a diagram that schematically illustrates a NFV architectural framework, in accordance with an embodiment that is described herein.

FIG. 2 is a diagram that schematically illustrates a NFV architectural framework 50, in accordance with an embodiment that is described herein. Architectural framework 50 comprises multiple physical computers 36 that belong to one or more networks such as, for example, networks 28 of system 20 above. Each computer 36 comprises a Network Functions Virtualization Infrastructure (NFVI) unit 54, which comprises hardware resources 52 for supporting the virtualization of the various VNFs. In the present example, hardware resources comprises commercial of the shelf hardware including computing hardware, e.g., one or more processors, storage hardware and networking hardware, e.g., one or more network adapters or Network Interface Controllers (NICs). In some embodiments, each network 28 comprises identical computers 36, which simplifies the design, deployment and maintenance of the system.

NFVI 54 further comprises a virtualization layer 56 (i.e., a software layer), which virtualizes and abstracts hardware resources 52 for upper software layers. NFVI 54 comprises a Virtualized Network Function (VNF) unit 58 that comprises multiple virtual functions such as VNF1, VNF2 and VNF3, which implement (in software) respective network services using hardware resources 52 via virtualization layer 56. The VNFs in VNF unit 58 may implement communication services such as those of VNFs 32 of FIG. 1 above. Each of the VNFs in VNF unit 58 may be managed by a respective Element Management System (EMS), when applicable.

Architectural framework 50 comprises NFV M&O unit 40, which is also referred to simply as M&O unit 40, for brevity. M&O unit 40 comprises an orchestrator 62, multiple VNF managers 66 that each manages one or more of the VNFs in VNF unit 58, and a virtualized infrastructure manager 70, which controls NFVI 54. M&O unit 40 additionally comprises VNF allocator 42 as described above.

Operations Support System (OSS) and Business Support System (BSS) unit 74 supports network management and service providing. The OSS supports management functions such as network inventory, service provisioning, network configuration and fault management. The BSS runs business operations towards customers of the service provider. M&O unit 40 and OSS/BSS unit 74 can communicate with one another to enable the integration of VNF unit 58 into existing networks that do not yet support, or only partly support NFV architecture.

Architectural framework 50 comprises a service, VNF and infrastructure description unit 78, which is also referred to herein as simply description 78, for brevity. Description 78 provides M&O unit 40 with definitions of the required services to be implemented using the VNFs. In addition, description 78 may provide information regarding the hardware resources in NFVI 54 that are available for running the VNFs, and statistical properties of the network traffic. Alternatively or additionally, description 78 may include any other inputs to M&O unit 40 that may be relevant for the design of the NFV architecture. The statistical properties of the traffic may be predefined, or estimated, for example, by M&O unit 40.

As noted above, in some embodiments, M&O unit 40 comprises VNF allocator 42, which allocates the VNFs to the physical computers in accordance with some optimality criterion. In an embodiment, description unit 78 provides architectural and other definitions and requirements to VNF allocator 42, to be used for finding the optimal allocation of the VNFs.

The network operational conditions and/or requirements may change over time. When such a change occurs, the operator may update description unit 78 to allow M&O unit 40 to adjust the design to the new conditions. Alternatively, adjusting the design based on the conditions change is automatic and does not involve the operator. Conditions change may include, for example, adding or removing new physical resources and/or VNFs, updating a VNF to an upgraded version and/or any other suitable architectural change in the system.

The system and framework configurations of FIGS. 1 and 2 are given by way of example, and any other suitable system and framework configurations can also be used. For example, in FIG. 1, system 20 can support any other suitable set(s) of VNFs, and the VNFs can be clustered into one or more networks 28 in any suitable way. Networks 28 may comprise any suitable communication network using any suitable communication protocols, and deliver network traffic at any suitable data rate.

Typically, VNF allocator 42 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

The different elements of VNF allocator 42 may be implemented using software, or using suitable hardware such as an Application-Specific Integrated Circuit (ASIC) or Field-Programmable Gate Array (FPGA). In some embodiments, elements of VNF allocator 42 can be implemented using a combination of hardware and software elements.

Example VNF Allocation Strategies

As described above, the selected allocation strategy may affect the system performance. Examples of allocating a given set of VNFs to physical machines in two different ways are given herein. The examples demonstrate how different allocation strategies may result in different system performance.

Assume a NFV network that supports four VNFs: {DPI, LB, FW, QoE}. Also assume that a single machine cannot run all of the VNFs (e.g., because of CPU/memory/software constraints), and therefore the four VNFs should be allocated to two hardware machines, i.e., two VNFs per machine. Further assume that the network traffic comprises packets of three different types. Each packet type is associated with a subset of the four VNFs that the network should apply to packets of that type. Table 1 summarizes the different packet types, including their occurrence probabilities and required services.

TABLE 1

Required services and occurrence probability per packet type.

| Packet Type | Services to be applied to the packet | Packet occurrence probability |
| --- | --- | --- |
| Type1 | {DPI, LB} | 0.6 |
| Type2 | {FW, DPI} | 0.3 |
| Type3 | {QoE, FW, LB} | 0.1 |

To fully serve a given packet, the network should apply to the packet all the VNFs that are listed for the respective packet type. The VNFs assigned for a given packet type may be deployed in a single physical machine or in multiple machines. In the description that follows we assume a serving model by which the processing delay within a single machine is nearly independent on the number of VNFs applied to the packet. Moreover, when at least some of the VNFs assigned for a given packet are deployed in multiple machines, the overall processing delay is strongly dependent on the number of the machines involved.

Note that allocating VNFs that belong to a given processing chain to the same machine improves not only the processing latency, but also the overall network usage. This is because such VNF allocation reduces unnecessary traffic among multiple machines that would have been needed to implement the given processing chain, and therefore reducing the probability for bottleneck and congestion events across the network.

We now consider two allocation examples denoted Example1 and Example2. The examples are also discussed with reference to FIGS. 3A and 3B below. In Example1, {DPI, FW} are allocated to one machine and {LB, QoE} to the other machine. Using this allocation, packets of Type1 and Type3 are each processed by both machines (incurring two time units to process), while packets of Type2 are processed by a single machine (incurring only one time unit to process). The average packet processing delay is therefore given by T=0.6·2+0.3·1+0.1·2=1.7 time units.

In Example2, {DPI, LB} are allocated to one machine and {FW, QoE} to the other machine. In this allocation, the packets of Type1 are processed by a single machine, and the packets of Type2 and Type3 are each processed by both machines. The average packet processing delay in this case is given by T=0.6·1+0.3·2+0.1·2=1.4 time units. The average packet processing delay in Example2 is thus shorter than in Example1. It can be shown that the allocation in Example2 is optimal, i.e., no other allocation strategy can achieve shorter processing delay.

The examples given above demonstrate that different allocation strategies may affect the system performance (e.g., the average processing delay) considerably. VNF allocation methods for achieving optimal performance are described below.

Methods for Optimal VNF Allocation

Assume a NFV network that supports a set of k VNFs. The set of VNFs can be represented by assigning to each VNF a unique index in the set K={1 . . . k}. In Example 1 and Example 2 described above, the set K={1, 2, 3, 4} refers to the respective VNFs {DPI, LB, FW, QoE}.

Assume that the network traffic comprises packets of L different types. Let S(l) denote a subset of the VNFs that should be applied to packets of type 1≤l≤L. S(l) can be represented by the indices in K of the relevant VNFs. The occurrence probability of a packet whose type l is associated with a set S(l) is denoted $P_{S(l)}$. In Example1 and Example2 above L=3. As depicted in Table 1 above, the subsets of VNFs are defined as S(Type1)={DPI, LB}, S(Type2)={FW, DPI} and S(Type3)={QoE, FW, LB}. The respective occurrence probabilities are given by $P_{S(Type1)}$=0.6, $P_{S(Type2)}$=0.3 and $P_{S(Type3)}$=0.1.

Figure 3A:
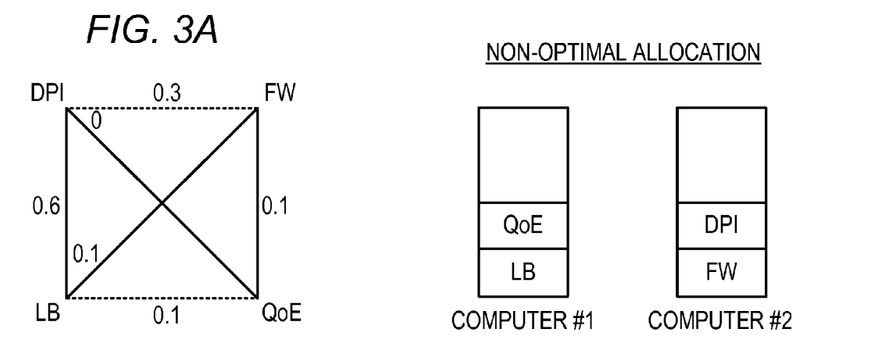
FIGS. 3A and 3B are diagrams that schematically illustrate examples of using graph representation for allocating pairs of VNFs to hardware machines, in accordance with an embodiment that is described herein.
Figure 3B:
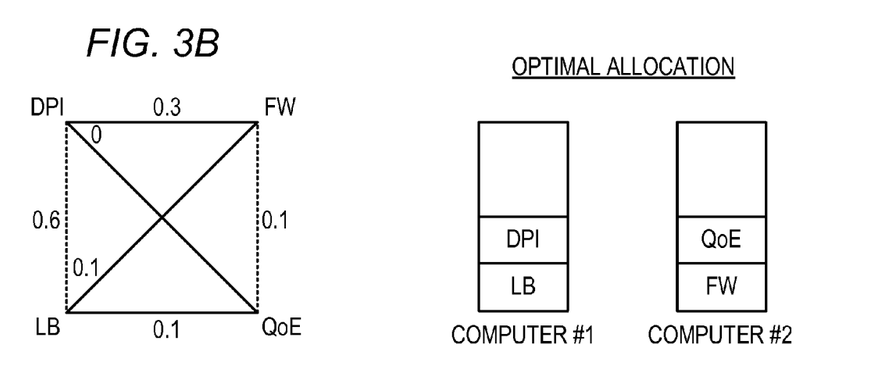

FIGS. 3A and 3B are diagrams that schematically illustrate examples of using graph representation for allocating pairs of VNFs to hardware machines, in accordance with an embodiment that is described herein. Let G=(V,E) denote a graph, wherein V denotes the set of vertices of the graph and E denotes the set of edges connecting between the vertices. In the present model, the vertices V respectively represent the VNFs, i.e., each vertex is associated with a unique VNF and $|V|=|K|=k$. The indices $\{1 \ldots k\}$ of the VNFs can therefore be used as indices of the respective graph vertices.

Each of the graphs depicted in FIGS. 3A and 3B represents the four VNFs {DPI, LB, FW, QoE} to be allocated the machines denoted computer #1 and computer #2. Following Example1 and Example2 above, in FIG. 3A the VNFs are allocated in pairs {DPI, FW} and {LB, QoE} and in FIG. 3B the VNFs are allocated in pairs {DPI, LB} and {FW, QoE}. The VNF allocated in pairs are indicated by dashed lines.

Let i and j denote two vertices in V, or equivalently two respective VNFs-VNF(i) and VNF(j), and let $e_{ij}$ in E denote the edge connecting between these vertices. In some embodiments, the VNF allocator assigns to the edge $e_{ij}$ a weight $W(e_{ij})$ in accordance with Equation 1.

$$W(e_{ij}) = \sum_{S(l),(i,j) \subseteq S(l)} P_{S(l)} \qquad \text{Equation 1}$$

Equation 1 sums up the occurrence probabilities of all the packet types l for which the respective set S(l) includes both VNF(i) and VNF(j). The weight $W(e_{ij})$ thus evaluates the probability that VNF(i) and VNF(j) should be both applied jointly to any given packet.

In FIGS. 3A and 3B, the weights attached to the graph edges are calculated using Equation 1. For example, since in Table 1 above, DPI and LB appear jointly only for Type1 packets, the weight assigned to the edge DPI-LB equals 0.6. As another example, no packet type requires to apply DPI and QoE jointly, and therefore the weight assigned to the edge DPI-QoE equals 0.

Given a graph G=(V,E), a matching M in G comprises a subset of edges of E that includes only pairwise non-adjacent edges. In other words, no two edges in M share a common vertex. The edges of a matching M indicate VNF pairs that are each jointly allocated to the same physical machine. In FIGS. 3A and 3B the edges of a matching M are indicated by dashed lines.

In an embodiment, the VNF allocator assigns a weight W(M) to a matching M by calculating the sum of weights of the individual edges of M as given in Equation 2:

$$W(M) = \sum_{e \in M} W(e) \qquad \text{Equation 2}$$

It can be shown that the average packet processing delay T is given by:

$$T = \sum_{S(l)} P_{S(l)} \cdot |S(l)| - W(M) \qquad \text{Equation 3}$$

The sum part in Equation 3 depends only on the subsets S(l) of VNFs, and on the respective occurrence probabilities $P_{S(l)}$ and is independent of the actual VNF allocation that may be selected. Therefore, given the packet types l=1 . . . L and the respective subsets S(l) and probabilities $P_{S(l)}$, the VNF allocator minimizes the average packet processing delay T by finding a matching $M \subset E$ for which W(M) is maximal. Such a matching is also referred to herein as a maximal matching.

In FIGS. 3A and 3B, the sum part of Equation 3 is given by $0.6 \cdot 2 + 0.3 \cdot 2 + 0.1 \cdot 3 = 2.1$. In FIG. 3A, the matching M comprises the edges DPI-FW and QoE-LB and thus W(M)= 0.3+0.1=0.4. The average processing delay equals T=2.1− 0.4=1.7 time units. In FIG. 3B, the matching M comprises the edges DPI-LB and FW-QoE and therefore W(M)=0.6+ 0.1=0.7, and the average processing delay T equals T=2.1− 0.7=1.4 time units. Equation 3 thus results in the same T as given in Example1 and Example2 using a direct calculation.

A method for allocating pairs of VNFs to physical machines is described herein. The method can be executed, for example, by VNF allocator 42. The method includes the following main steps:

STEP1: receive a definition of the VNFs to be allocated.

STEP2: receive a definition of the packet types that are expected in the network traffic. The definition includes the respective occurrence probabilities and subsets of the VNFs that should be applied to the packets of each type.

STEP3: based on the definitions in STEP1 and STEP2, generate a graph G=(V, E) whose vertices V respectively represent the VNFs, and wherein vertices that are connected by an edge in E indicate VNFs that are allocated to the same hardware machine. Assign weights to the graph edges, using, for example, Equation 1 above.

STEP4: find a maximal matching $M \subset E$ for which the weight of M, as given for example in Equation 2 above, is maximal. For the maximal matching, the average packet processing delay is minimized and can be calculated, for example, using Equation 3 above. In an embodiment, VNF allocator 42 finds the maximal matching using methods that are described, for example, in "Paths, trees, and flowers," the Canadian Journal of mathematics, volume 17, number 3, pages 449-467, 1965, which is incorporated herein by reference. In alternative embodiments, any other suitable method for finding the maximal matching can also be used.

STEP5: use the maximal matching M found at STEP4 to allocate the VNFs whose vertices are connected by edges of M to the same physical machine.

Extended Methods for VNF Allocation

The method described above for allocating pairs of VNFs using graph representation can be extended for allocating VNF in groups of size C>2 per machine. The extended allocation method uses the same graph representation described above, and therefore starts with the same steps STEP1, STEP2 and STEP3 described above.

The extended allocation method then partitions the vertices V of the graph G=(V, E) into multiple disjoint subsets $A_n \subseteq V$ of size C, so that $A_n$ does not include unconnected vertices. Moreover, any two vertices in $A_n$ are connected by a path that comprises a sequence of one or more edges. In graph theory terminology, the structure of $A_n$ is sometimes referred to as a connected component or a connected subgraph. Note that the vertices of $A_n$ indicate respective VNFs that should be allocated to the same physical machine. Given a number N of available physical machines, the extended allocation method can allocate up to (N·C) VNFs to the N machines.

In an embodiment, the extended allocation method partitions the set of vertices V of G using an iterative process. The method starts with the full graph $G_1(V_1, E_1)=G(V,E)$ and with an empty partition set PR={ }. In each iteration n, the method uses a partial graph that is derived from the graph of the previous iteration, i.e., $G_n \subset G_{n-1}$ and $V_n \subset V_{n-1}$. During iteration $1 \leq n \leq N$ the method selects a subset $A_n \subseteq V_n$ and adds $A_n$ to the partition PR. The method then excludes the vertices of $A_n$ from graph $G_n$ (or $V_n$) prior to executing the next iteration. Following STEP1, STEP2 and STEP3 the extended allocation method proceeds with the following steps:

STEP 4: INIT: set a temporary graph G'=G=(V, E), V'=V, E'=E.

STEP 5: OUTER_LOOP, N iterations:

STEP 6: scan the edges in G' to find an edge $e_{ij}$ having the maximal weight $W(e_{ij})$. Set A={i,j}.

INNER_LOOP, repeat (C−2) times:

For every u in E'\A calculate g(u) as given in Equation 4 below, and select the vertex u for which g(u) is maximal. Add the selected vertex u to A, i.e., A=A∪{μ}.

$$g(u) = \sum_{v \in A} W(e_{uv}) \qquad \text{Equation 4}$$

When terminating the inner loop, the set A includes C vertices that represent the VNFs to be allocated jointly to the same physical machine.

Step 7: Add the set A to the partition set PR, PR={PR∪A}.

Step 8: Exclude the vertices of A and any other vertex that connects by an edge to a vertex in A to produce a remaining graph G'. Continue with the outer loop at STEP 6 using the remaining graph G'.

Step 9: when the outer loop terminates allocate the VNFs in accordance with the final partition PR={A1 . . . AN}.

Figure 4:
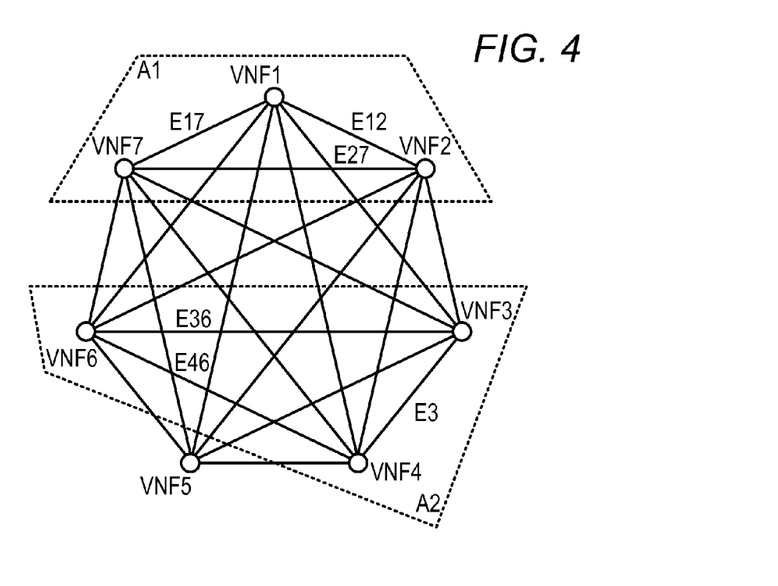
FIG. 4 is a diagram of an example graph used for allocating subsets of multiple VNFs to hardware machines, in accordance with an embodiment that is described herein.

FIG. 4 is a diagram of an example graph used for allocating subsets of multiple VNFs to hardware machines, in accordance with an embodiment that is described herein. The graph in FIG. 4 comprises seven vertices corresponding to VNF1 . . . VNF7. We now describe the operation of the extended allocation method described above using the graph for allocating subsets of three VNFs.

At steps STEP1, STEP2 and STEP3 (described above) the method receives the design definitions and produces the graph of FIG. 4. In the first iteration the method selects A1={VNF1, VNF2, VNF3}. Assuming that the edge E12 has the maximal weight, the method first defines A1={VNF1, VNF2} at STEP6. Assuming that the next maximal weight edge is E17, the method then adds VNF7 to A1 in the inner loop. The partition after the first iteration is given by PR={A1}. The method then excludes from the graph the vertices of A1—VNF1, VNF2 and VNF7, as well as any edge that connects to some vertex of A1. The remaining graph G' includes the vertices V'={VNF3, VNF4, VNF5, VNF6}. In the next iteration the method selects the subset A2={VNF3, VNF4, VNF6} using similar procedures. Note that after excluding the vertices of A2 from G', the remaining graph includes only VNF5. The final partition is therefor given by PR={A1, A2, VNF5}.

The allocation methods described above using the graphs depicted in FIGS. 3A, 3B and 4 are given by way of example, and other suitable allocation methods and related graphs can also be used. For example, the method for allocating pairs of VNFs by selecting a maximal matching, as depicted in FIGS. 3A and 3B can be applied to any number of VNFs other than four.

As another example, the extended allocation method that was demonstrated using the graph of FIG. 4 can be modified to support allocating a different number of VNFs in different physical computers. In such embodiments, the method selects a subset A of a desired size in each of the iterations. As yet another example, in some embodiments, the extended allocation method executes N−1 iteration (instead of N iterations) and the vertices remaining after the last iteration comprise the $N^{th}$ subset. As yet another example, the VNF allocator can generate multiple graph partitions using any suitable method, and then choose the best partition among the generated partitions.

Figure 5:
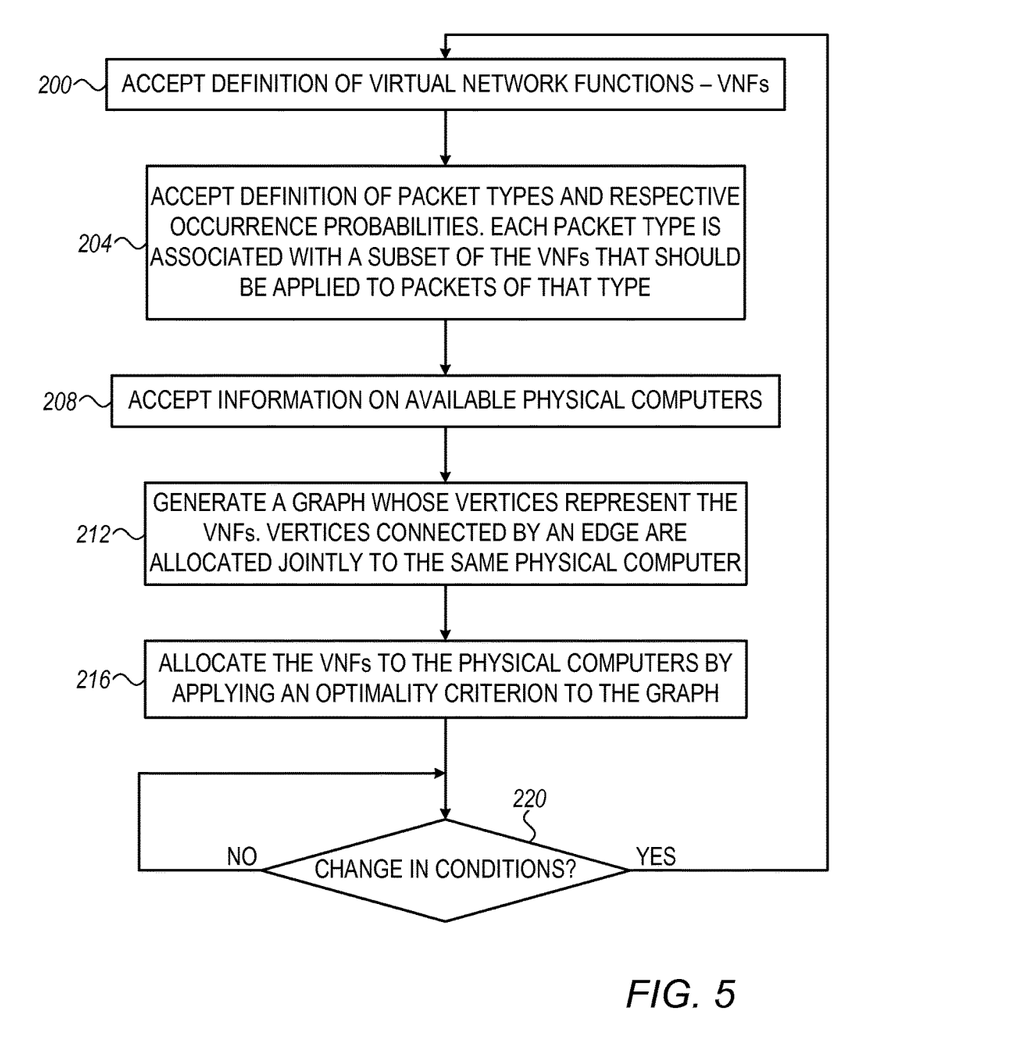
FIG. 5 is a flow chart that schematically illustrates a method for optimal allocation of multiple VNFs to physical computers, in accordance with an embodiment that is described herein.

FIG. 5 is a flow chart that schematically illustrates a method for optimal allocation of multiple VNFs to physical computers, in accordance with an embodiment that is described herein. The method can be executed, for example, by processor 44 of VNF allocator 42 of FIGS. 1 and 2 above.

The method begins by processor 44 accepting a definition of the used VNFs at a VNF definition step 200. The definition at step 200 typically includes information regarding the service(s) that each VNF implements, the hardware resources required by each VNF (i.e., computational, storage and networking resources) and interfacing mechanisms for each VNF.

At a traffic definition step 204, processor 44 accepts information regarding the network traffic. More specifically, the definition includes the packet types that are expected in the network traffic. For each packet type, the definition also includes the respective occurrence probability and a subset of the VNFs that should be applied to packets of that type.

At a physical resources definition step 208, processor 44 accepts information regarding the physical computers that are available for running the VNFs. The information at step 208 may specify which combinations of VNFs can be executed on each physical computer. In some embodiments, the physical computers comprise similar or identical hardware resources and therefore all the computers support running the same combinations of VNFs. In an embodiment, all the VNFs are additionally modeled as consuming similar hardware resources, and therefore each computer can run the same number of VNFs in any desired combination. In such embodiments, processor 44 may allocate a number C of VNFs to each available computer.

In some embodiments, the definitions at steps 200, 204 and 208 are provided to processor 44 using description 78 of FIG. 2 above.

At a graph generation step 212, based on the definition accepted at steps 200, 204 and 208, processor 44 generates a graph whose vertices represent the VNFs, and wherein any two VNFs whose respective vertices are connected by an edge should be allocated jointly to the same physical computer. At step 212, processor 44 can generate any suitable graph. For example, processor 44 may generate an undirected graph in which every pair of distinct vertices is connected by a unique edge. Such a graph is referred to herein as a complete graph.

Alternatively or additionally, at step 212 processor 44 may assign any suitable weights to some or all of the graph edges, in which case the graph is referred to herein as a weighted graph. In an embodiment, processor assigns weights to the graph edges based on the statistical properties of the traffic packets and on the VNFs that should be applied to each packet type.

In an embodiment, some of the VNFs should not be allocated jointly. For example, the VNFs may be clustered by design to separate sets to be allocated in different computers. In such embodiments, processor 44 excludes from the graph edges that connect between vertices of VNFs that should be allocated in different computers.

At an allocation step 216, processor 44 uses the graph generated at step 212 to find an optimal (or close to optimal)

allocation of the VNFs to the physical computers, by applying a suitable optimality criterion to the graph. In some disclosed embodiments, processor 44 selects the allocation for which the average processing delay per packet is minimal.

Processor 44 can use any suitable method for finding an optimal allocation. For example, when allocating pairs of VNFs to the physical machines, processor 44 can find a maximal matching as described above. As another example, when allocating three or more VNFs per physical machine, processor 44 can find an allocation partition using the extended allocation method described above.

In some embodiments, processor 44 deploys the VNFs in the physical computers in accordance with the allocation found at step 216, e.g., via interface 48. Note that after processor 44 deploys the VNFs in the physical computers, the NFV network automatically applies to each traffic packet the required set of VNFs.

At a change check step 220, processor 44 checks whether the conditions and/or system requirements for which the allocation was found at step 216 have changed. For example, a physical computer may have been removed or added to the pool, a new VNF may have been removed or added, the statistical properties of the traffic packets may have changed and the like. When at step 220 the conditions have not changed processor 44 loops back to step 220. Otherwise, some change has occurred, and processor 44 loops back to step 200 to accept new definitions at one or more of steps 200, 204 and 208 as described above.

The method of FIG. 5 is given by way of example and any other suitable method can also be used. For example, although in the above description the weights assigned to the graph edges depend on the statistical properties of the network traffic, any other suitable weights can also be used. As another example, although in the disclosed methods the VNF allocation aims to achieve minimal packet processing delay, other suitable optimality criteria can also be used.

In the embodiments disclosed above the VNFs to be allocated are represented as vertices of a graph, and the graph is processed to find the optimal VNF allocation. In alternative embodiments any other suitable representation and processing methods can also be used for optimal VNF allocation.

In some embodiments, searching for the VNF allocation is done under certain constraints. For example, each computer may be configured to process only a partial subset of the packet types. As another example, VNFs may be allocated to machines with bandwidth limitations so that the bandwidth of the traffic processed by the VNFs in a given machine does not exceed the maximal bandwidth that the machine can handle.

In some embodiments, instead of minimizing the average processing time, the optimal VNF allocation attempts to set an upper bound on the maximal processing time. Such optimality criterion may be useful when the service should be provided within a fixed time to all the packet types.

Other optimality metrics may include the cost of sending traffic from a VNF on one machine to the next VNF in the processing chain to another machine over the network.

When the network or cloud is heterogeneous (i.e., comprises machines from different vendors) the proximity to accelerators in servers/switches/NIC can also be used as an optimality criterion Although the embodiments described herein mainly address allocation of VNFs to machines in a communication or computing system, the methods and systems described herein can also be used in other applications, such as in allocating applications to machines in a cloud computing environment.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for designing a Network Function Virtualization (NFV) architecture, the method comprising:
   accepting a definition of multiple Virtual Network Functions (VNFs), and of one or more packet types having respective occurrence probabilities, wherein each packet type is associated with a respective subset of the VNFs that are to be applied to packets of that packet type;
   further accepting information about multiple available physical computers, wherein the information specifies for each physical computer a respective constraint that limits the physical computer to run only a partial subset of the multiple VNFs; and
   allocating the VNFs to the physical computers by applying to the definition and the information an optimality criterion that causes each physical computer, to which one or more of the multiple VNFs were allocated, to meet its respective constraint,
   wherein allocating the VNFs comprises generating a graph in which each vertex represents a respective VNF and each edge indicates that the VNFs represented by the vertices of that edge are allocated jointly to the same physical computer, and processing the graph in accordance with the optimality criterion, by partitioning the graph into subsets, wherein each subset comprises the vertices corresponding to respective VNFs that are allocated jointly to the same respective physical computer.

2. The method according to claim 1, wherein partitioning the graph comprises selecting the subsets based on weights assigned to one or more edges of the graph.

3. The method according to claim 2, and comprising assigning the weights based on the definition.

4. The method according to claim 2, wherein selecting the subsets comprises maximizing a sum of weights of the edges included in the subsets.

5. The method according to claim 4, wherein selecting the subsets comprises maximizing the sum of weights in each subset individually.

6. The method according to claim 1, wherein partitioning the graph comprises defining at least two subsets that have a different number of vertices.

7. The method according to claim 1, wherein partitioning the graph comprises partitioning the graph into a partition that comprises pairwise non-adjacent edges, wherein no two edges in the partition share a common vertex of the graph.

8. The method according to claim 1, wherein partitioning the graph comprises selecting each of the subsets iteratively, by excluding the vertices of an already selected subset from the graph before selecting another subset.

9. The method according to claim 1, and comprising re-allocating the VNFs to the physical computers in response to a change in the definition or the information.

10. The method according to claim 1, wherein the optimality criterion aims to minimize a latency of applying the VNFs to the packets by the physical computers.

11. The method according to claim 1, wherein the optimality criterion aims to set an upper bound on a latency of applying the VNFs to the packets by the physical computers.

12. The method according to claim 1, wherein the optimality criterion aims to minimize a network bandwidth consumed by applying the VNFs when allocated to the physical computers.

13. An apparatus for designing a Network Function Virtualization (NFV) architecture, the apparatus comprising:
- a memory, which is configured to hold a definition of multiple Virtual Network Functions (VNFs), and of one or more packet types having respective occurrence probabilities, wherein each packet type is associated with a respective subset of the VNFs that are to be applied to packets of that packet type, and to further hold information about multiple available physical computers, wherein the information specifies for each physical computer a respective constraint that limits the physical computer to run only a partial subset of the multiple VNFs; and
- a processor, which is configured to allocate the VNFs to the physical computers by applying to the definition and the information an optimality criterion that causes each physical computer, to which one or more of the multiple VNFs were allocated, to meet its respective constraint,
- wherein the processor is configured to allocate the VNFs by generating a graph in which each vertex represents a respective VNF and each edge indicates that the VNFs represented by the vertices of that edge are allocated jointly to the same physical computer, and to process the graph in accordance with the optimality criterion, by partitioning the graph into subsets, wherein each subset comprises the vertices corresponding to respective VNFs that are allocated jointly to the same respective physical computer.

14. The apparatus according to claim 13, wherein the processor is configured to select the subsets based on weights assigned to one or more edges of the graph.

15. The apparatus according to claim 14, wherein the processor is configured to assign the weights based on the definition.

16. The apparatus according to claim 14, wherein the processor is configured to select the subsets by maximizing a sum of weights of the edges included in the subsets.

17. The apparatus according to claim 16, wherein the processor is configured to select the subsets by maximizing the sum of weights in each subset individually.

18. The apparatus according to claim 13, wherein the processor is configured to partition the graph by defining at least two subsets that have a different number of vertices.

19. The apparatus according to claim 13, wherein the processor is configured to partition the graph into a partition that comprises pairwise non-adjacent edges, wherein no two edges in the partition share a common vertex of the graph.

20. The apparatus according to claim 13, wherein the processor is configured to select each of the subsets iteratively, by excluding the vertices of an already selected subset from the graph before selecting another subset.

21. The apparatus according to claim 13, wherein the processor is configured to re-allocate the VNFs to the physical computers in response to a change in the definition or the information.

22. The apparatus according to claim 13, wherein the optimality criterion aims to minimize a latency of applying the VNFs to the packets by the physical computers.

23. The apparatus according to claim 13, wherein the optimality criterion aims to set an upper bound on a latency of applying the VNFs to the packets by the physical computers.

24. The apparatus according to claim 13, wherein the optimality criterion aims to minimize a network bandwidth consumed by applying the VNFs when allocated to the physical computers.

* * * * *